(12) United States Patent
Becker et al.

(10) Patent No.: US 11,053,736 B1
(45) Date of Patent: Jul. 6, 2021

(54) LADDER FOR A FLAT BED TRUCK OR TRAILER

(71) Applicants: Todd J. Becker, Arlington, NE (US); James O. Becker, Omaha, NE (US)

(72) Inventors: Todd J. Becker, Arlington, NE (US); James O. Becker, Omaha, NE (US)

(*) Notice: Subject to any disclaimer, the term of this patent is extended or adjusted under 35 U.S.C. 154(b) by 235 days.

(21) Appl. No.: 16/296,810

(22) Filed: Mar. 8, 2019

(51) Int. Cl.
| | |
|---|---|
| *E06C 5/20* | (2006.01) |
| *B60R 3/02* | (2006.01) |
| *B60R 3/00* | (2006.01) |
| *E06C 5/02* | (2006.01) |
| *E06C 5/24* | (2006.01) |

(52) U.S. Cl.
CPC ............... *E06C 5/20* (2013.01); *B60R 3/007* (2013.01); *B60R 3/02* (2013.01); *E06C 5/02* (2013.01); *E06C 5/24* (2013.01); *B60R 3/005* (2013.01)

(58) Field of Classification Search
CPC ..... E06C 5/20; E06C 5/02; E06C 5/24; B60R 3/02; B60R 3/005; B60R 3/007
See application file for complete search history.

(56) References Cited

U.S. PATENT DOCUMENTS

| | | | | | |
|---|---|---|---|---|---|
| 1,717,486 | A | * | 6/1929 | Allen | E06C 5/24 248/503 |
| 3,469,654 | A | * | 9/1969 | Dohrman | B60R 3/02 182/88 |
| 3,563,342 | A | * | 2/1971 | Lasiter | B60R 3/02 182/97 |
| 5,024,292 | A | * | 6/1991 | Gilbreath | B60R 3/007 182/127 |
| 5,163,531 | A | * | 11/1992 | Whiting | E06C 5/02 182/127 |
| 6,003,633 | A | * | 12/1999 | Rolson | E06C 5/02 182/106 |
| 6,640,929 | B2 | * | 11/2003 | Korpi | B60R 3/02 182/127 |
| 7,448,637 | B2 | * | 11/2008 | Parker | B60R 3/02 182/88 |
| 7,870,932 | B2 | * | 1/2011 | Lapke | E02F 9/0833 182/127 |
| 7,992,681 | B2 | * | 8/2011 | Anderson | E06C 5/02 182/106 |
| 8,104,577 | B1 | * | 1/2012 | Reed | E06C 5/32 182/127 |
| 8,322,490 | B1 | * | 12/2012 | Loemker | E06C 5/24 182/127 |
| 8,640,826 | B1 | * | 2/2014 | Beilstein | E06C 7/182 182/127 |
| 8,678,411 | B2 | * | 3/2014 | Kibler | E06C 5/06 280/166 |
| 8,827,038 | B2 | * | 9/2014 | Salzman | B60R 3/02 182/127 |
| 2007/0273123 | A1 | * | 11/2007 | Wilson | B60R 3/02 280/166 |
| 2013/0015637 | A1 | * | 1/2013 | Siebrandt | B60R 3/007 280/495 |
| 2017/0298675 | A1 | * | 10/2017 | Dimig | B60Q 1/0076 |

* cited by examiner

*Primary Examiner* — Colleen M Chavchavadze
(74) *Attorney, Agent, or Firm* — Dennis L. Tomte; Thomte Patent Law Office LLC

(57) ABSTRACT

A ladder for a flat bed truck which is movably secured to one side of the flat bed truck. The ladder is selectively movable between a horizontally disposed stowed position beneath one side of the flat bed of the flat bed truck to an upstanding position outwardly of the one side of the flat bed of the truck.

3 Claims, 11 Drawing Sheets

LADDER FOR A FLAT BED TRUCK OR TRAILER

BACKGROUND OF THE INVENTION

Field of the Invention

This invention relates to a ladder for a flat bed truck or trailer. More particularly, this invention relates to a ladder which is movably secured to one side of a flat bed truck or trailer so that it may be stowed beneath one side of the flat bed truck or trailer and which may be moved to an upstanding locked position at the side of the bed of the flat bed truck or trailer to enable a person to climb onto the bed of the flat bed truck or trailer and to climb downwardly from the bed of the flat bed truck or trailer.

Description of the Related Art

Ladders have been previously provided for use with flat bed trucks or trailers (hereinafter "flat bed truck") to enable a person to climb onto the bed of the flat bed truck to unload items therefrom or to load items onto the bed of the flat bed truck. The prior art flat bed ladders also enable a person to climb downwardly from the flat bed of the truck. Some ladders of the prior art require that the ladder be selectively attached to the rub rail or side of the flat bed. Other ladders have been provided wherein the ladder is permanently attached to the side of the bed of the flat bed truck. None of the prior art ladders are able to be quickly and easily stowed at one side of the truck bed wherein the ladder, when stowed, does not interfere with other structure of the flat bed truck.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A ladder assembly is described for use with a flat bed truck having an elongated and longitudinally extending wheeled frame with the wheeled frame having a plurality of horizontally spaced-apart and horizontally disposed cross-members secured thereto which support a flat bed thereon with the flat bed having an upper side, a lower side, a forward end, a rearward end, a first side and a second side. The ladder assembly includes a vertically disposed mounting bracket having an upper end, a lower end, an inner side and an outer side. The upper end of the mounting bracket is secured to one of the cross-members so as to be positioned beneath the lower side of the flat bed inwardly of the first side of the flat bed. The ladder assembly also includes a horizontally disposed and cylindrical hollow first tube having an inner end and an outer end. The first tube is secured to the lower end of the mounting bracket whereby the first tube is parallel to the cross-member to which the mounting bracket is secured. The outer end of the first tube is positioned inwardly of the first side of the flat bed and positioned below the lower side of the flat bed.

The ladder assembly also includes an elongated and horizontally disposed second tube which is mounted in the first tube and which has inner and outer ends. The second tube is selectively horizontally movable with respect to the first tube between retracted and extended positions with respect to the first tube. The second tube is also selectively rotatable between first and second positions with respect to the first tube. The ladder assembly also includes a first locking structure for selectively locking the second tube in its retracted and extended positions and for selectively locking the second tube in the second position. The ladder assembly further includes an elongated ladder having an upper end and a lower end. The ladder is secured, intermediate the upper and lower ends thereof, to the outer end of the second tube for movement with the second tube. The ladder is horizontally disposed in a stowed position below the lower side of the flat bed inwardly of the first side of the flat bed when the second tube is in the retracted position and when the second tube is in the first position. The ladder is positioned in an upright position outwardly of the first side of the flat bed when the second tube is in the extended position and the second tube is in the second position.

It is therefore a principal object to provide an improved ladder assembly for a flat bed truck or trailer.

A further object of the invention is to provide a ladder for a flat bed truck which is movably secured to one side of the flat bed truck and which is selectively movable between a horizontally disposed stowed position beneath one side of the flat bed of the truck to an upstanding position outwardly of the one side of the flat bed of the truck.

A further object of the invention is to provide a ladder of the type described which is lockable in a stowed position and its upright position.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Figure 1:
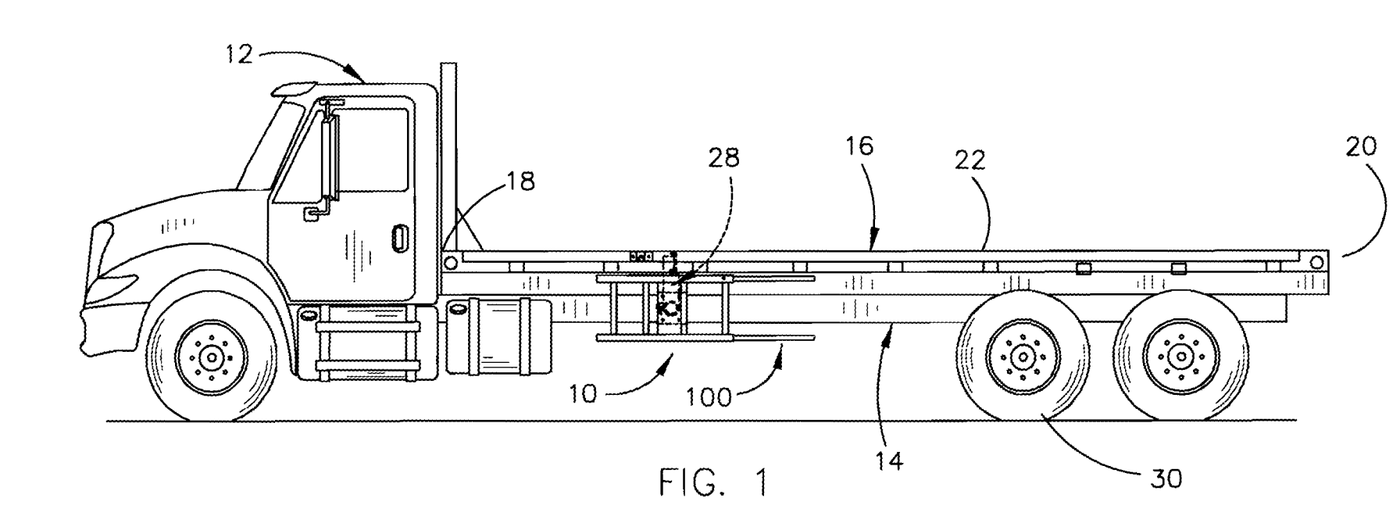
FIG. 1 is a side view of a flat bed truck having the ladder of this invention in its stowed position at one side of the flat bed of the truck.
Figure 2:
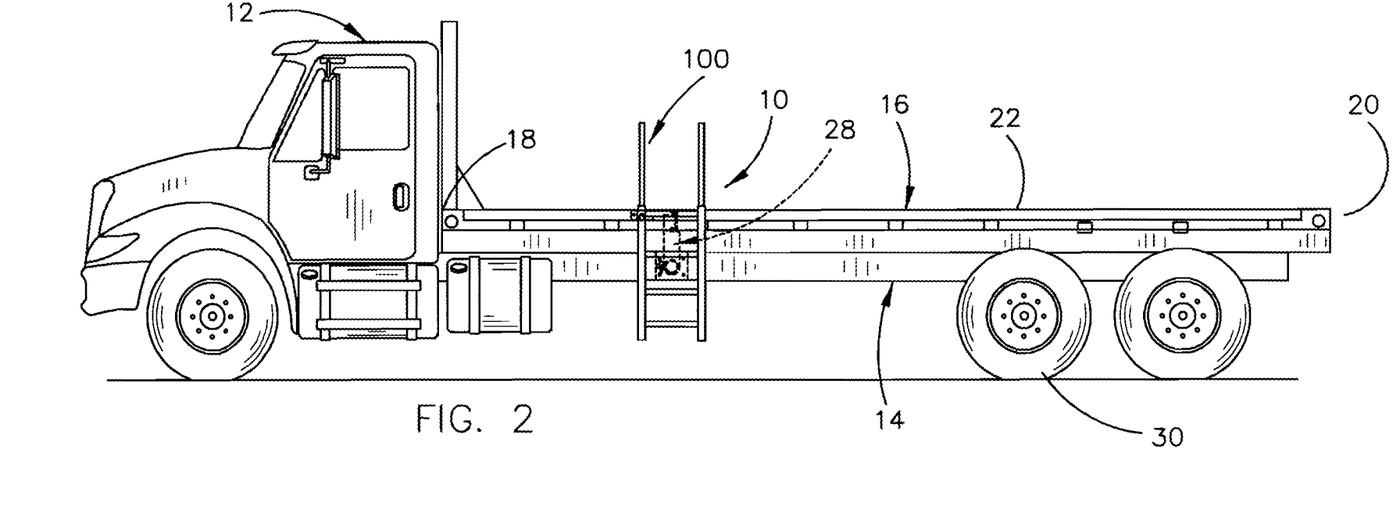
FIG. 2 is a side view of the flat bed truck of FIG. 1 with the ladder of this invention in its upstanding position at the side of the truck.
Figure 3:
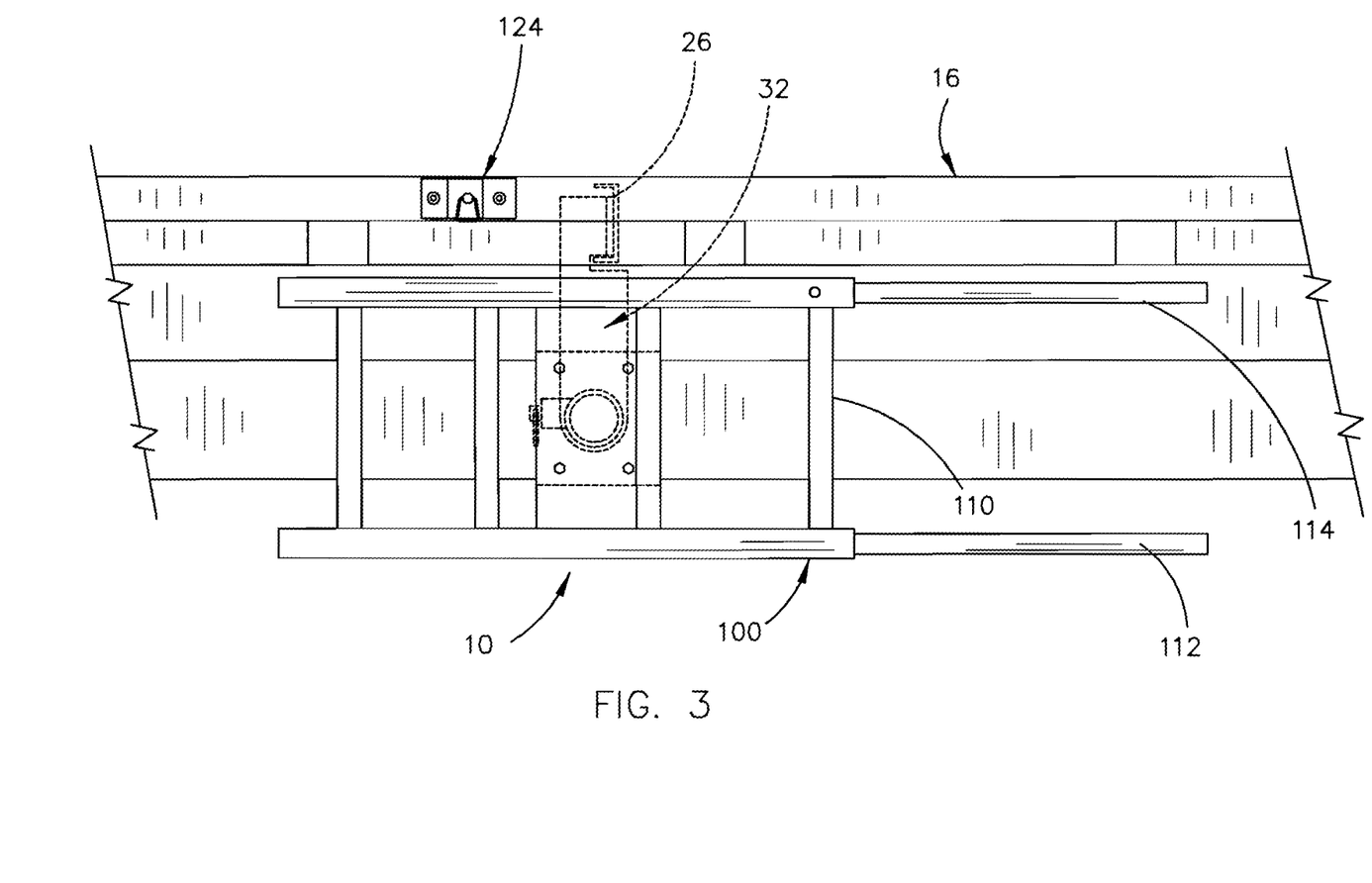
FIG. 3 is a partial side elevational view illustrating the ladder of this invention in its stowed position of FIG. 1.
Figure 4:
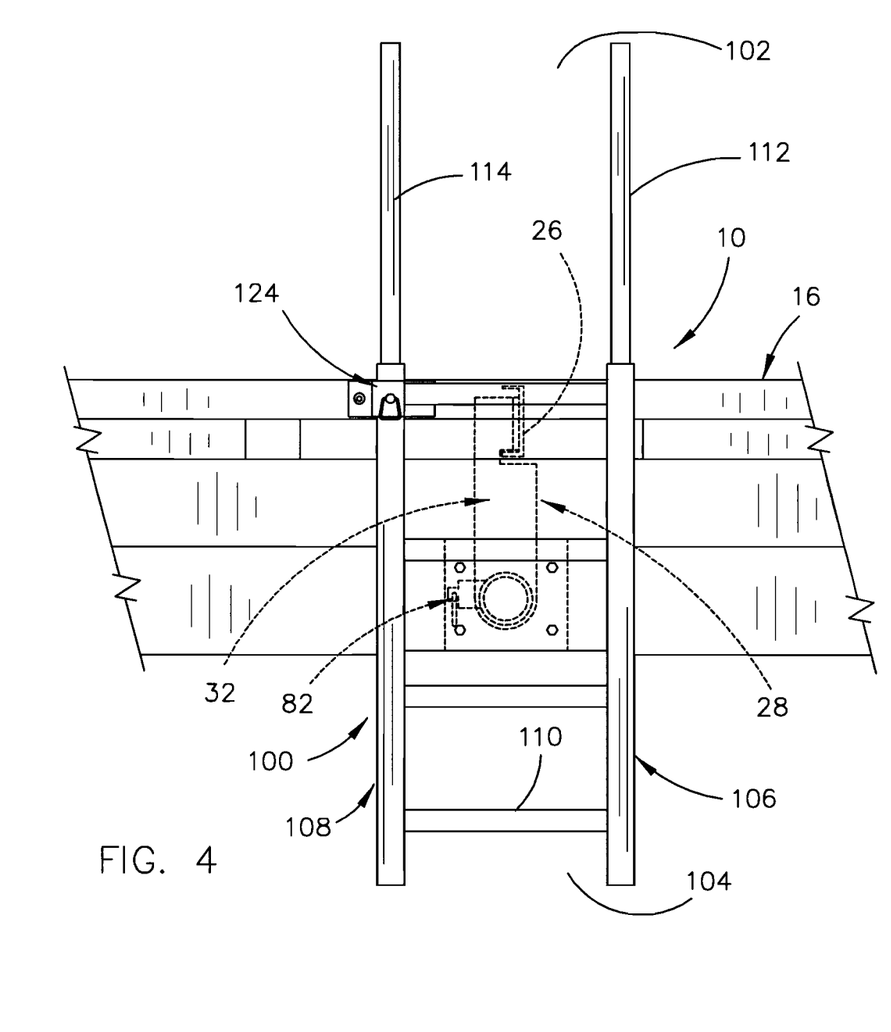
FIG. 4 is a partial side elevational view illustrating the ladder of this invention in its upstanding position of FIG. 2.
Figure 5:
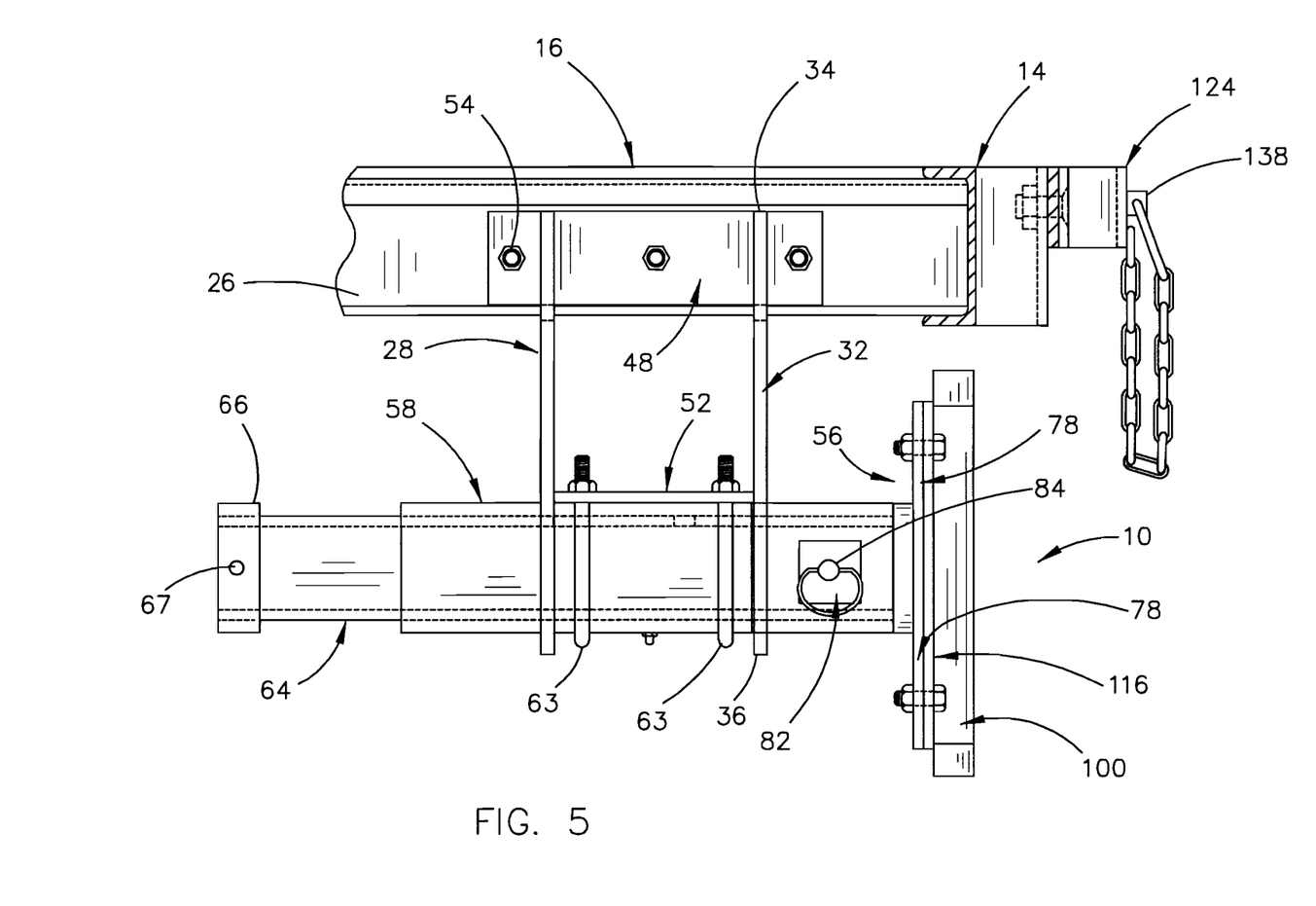
FIG. 5 is a partial side elevational view illustrating the ladder of this invention in its stowed position.
Figure 6:
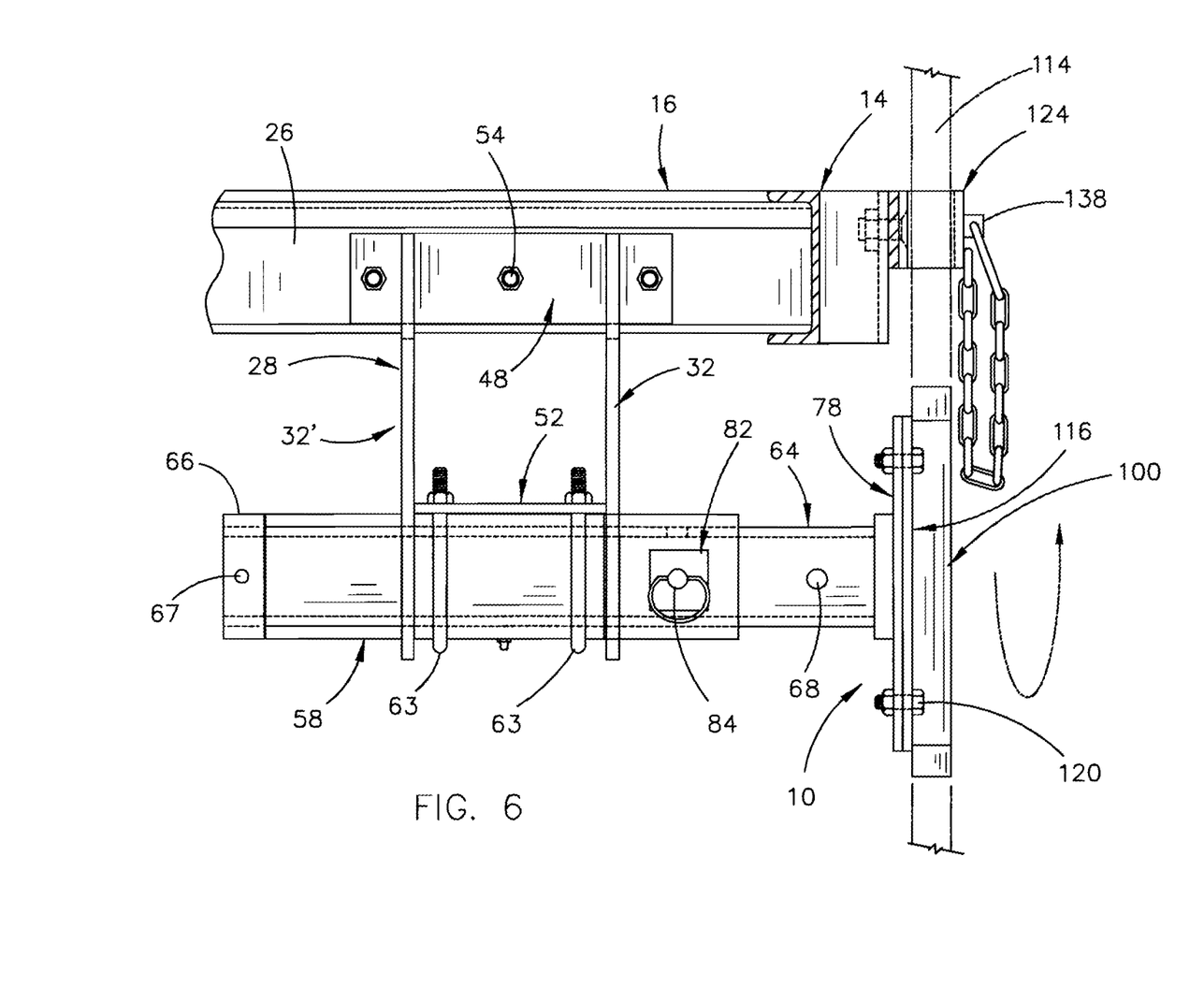
FIG. 6 is a partial side elevational view illustrating the ladder of this invention in its upstanding position.
Figure 7:
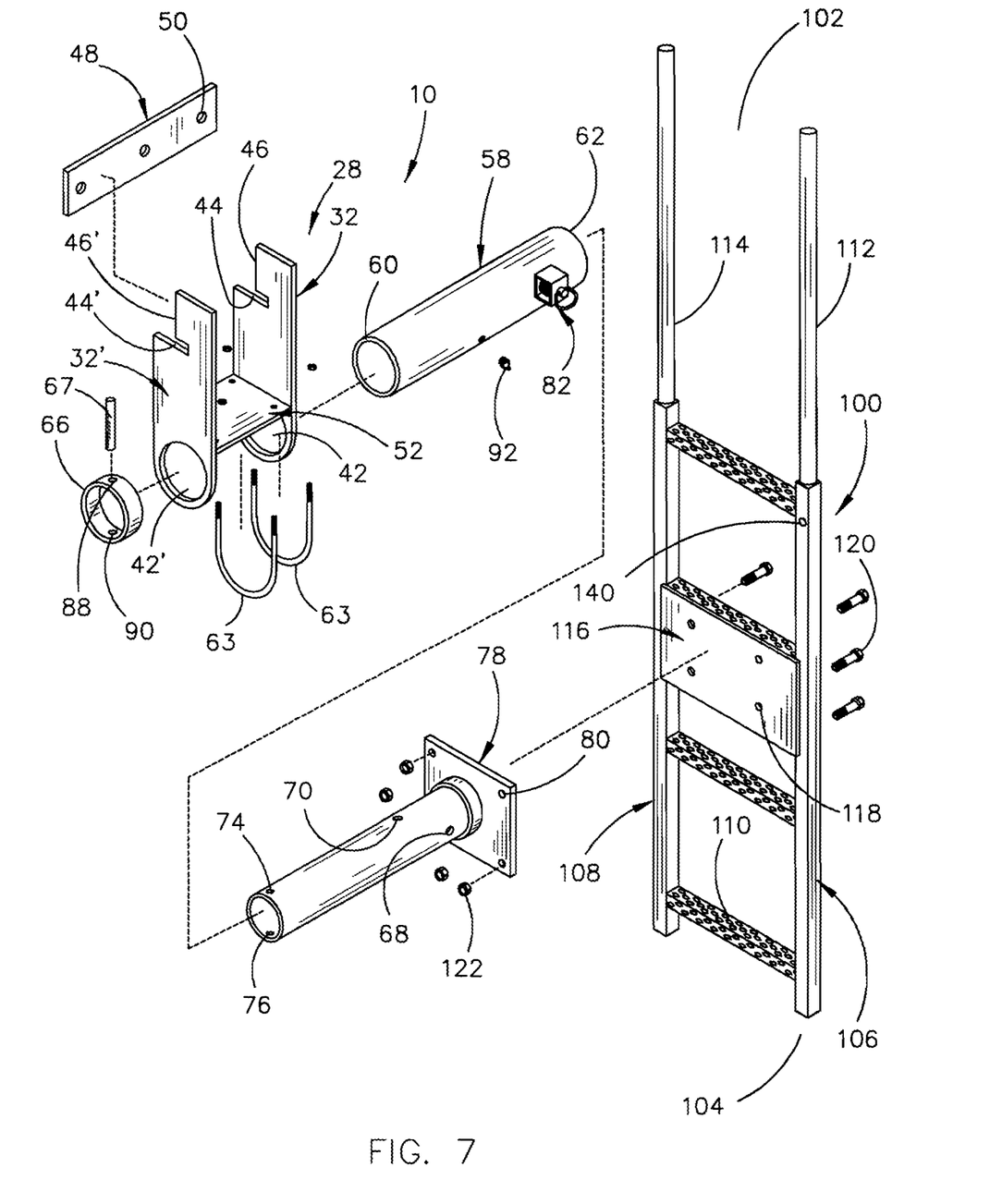
FIG. 7 is an exploded perspective view of the ladder assembly of this invention.

The numeral 10 refers to the ladder assembly of this invention which is designed to be movably positioned at one side of a flat bed truck or trailer 12 (hereinafter "flat bed truck"). Flat bed truck 12 includes a conventional wheeled frame 14 which supports a flat bed 16 thereon having a forward end 18, a rearward end 20, a left side 22 and a right side 24 (not shown). The wheeled frame 14 includes a plurality of cross-members 26 which connect the wheeled frame 14 to the flat bed 16. The cross-members 26 are usually of the I-beam or channel-type with upper and lower flanges which are horizontally disposed as seen in FIG. 3.

Ladder assembly 10 includes a mounting bracket 28 which is bolted to one of the cross-members 26 inwardly of left side 22 of flat bed 16 and forwardly of the wheels 30 of the wheeled frame 14. Bracket 28 includes a vertically disposed outer plate 32, having an upper end 34, a lower end 36, a forward end 38 and a rearward end 40. A circular hole 42 is formed in outer plate 32 at the lower end thereof. The rearward end 40 of outer plate 32 has a horizontally disposed slot 44 extending thereinto below the upper end 34 of outer plate 32. The upper rearward end 46 of outer plate 32 extends upwardly from slot 44 forwardly of the rearward end of slot 44. Bracket 28 also includes an inner plate 32' which is identical to outer plate 32 and will not be described in detail. The identical structure of inner plate 32' will be identified with "'".

A horizontally disposed mounting plate 48 is welded to the upper rearward ends 46 and 46' of plates 32 and 32' respectively and has bolt openings 50 formed therein. As seen, the upper rearward ends 46 and 46' of plates 32 and 32' are positioned forwardly of the rearward ends 40 and 40' of plates 32 and 32'. A horizontally disposed plate 52 is welded to plates 32 and 32' and extends therebetween above the circular holes 42 and 42'. The mounting plate 48 is secured to the forward side of one of the cross-member 26 by bolts 54 extending through the bolt openings 50 and bolt openings drilled in the cross-member 26. The forward end of the lower flange of the cross-member 26 is received in the slots 44 and 44'.

The numeral 56 refers to the ladder support of this invention. Ladder support 56 includes an elongated and horizontally disposed and cylindrical hollow tube 58 having an inner end 60 and an outer end 62. An elongated cylindrical tube 64 is selectively slidably and rotatably received in tube 58. A retainer ring 66 is secured to the inner end of tube 64 by pin 67 as will be described hereinafter. Tube 64 has a pin opening 68 formed therein inwardly of its outer end. Tube 64 also has a pin opening 70 formed therein inwardly of pin opening 68 and which is offset 90 degrees with respect to the pin opening 68. The inner end 72 of tube 64 has a pair of pin openings 74 and 76 formed therein. A mounting plate 78 is secured to the outer end of tube 64 and has bolt openings 80 formed therein.

The numeral 82 refers to a spring loaded locking pin assembly which includes a spring loaded locking pin 84 having a ring 86 secured thereto. A conventional spring 87 is mounted in locking pin assembly 82 which yieldably urges the locking pin 84 inwardly through an opening in tube 58 and into one of the pin openings 68 and 70 as will be described hereinafter. The tube 58 is positioned in the holes 42 and 42' and is held therein by a pair of U-bolts 63 which embrace tube 58 and which are secured to the plate 52 in conventional fashion.

The numeral 100 refers to the ladder of this invention having an upper end 102 and a lower end 104. Ladder 100 includes a first side member 106, a second side member 108 and a plurality of steps or treads 110 extending therebetween. Side members 106 and 108 have handles or support members 112 and 114 at the upper ends thereof respectively. A mounting plate or bracket 116 is secured to side members 106 and 108 and extends therebetween the upper and lower ends thereof. Bracket 116 has a plurality of bolt openings 118 formed therein which are configured to receive bolts 120 therein. Bracket 78 is secured to bracket 116 by bolts 120 extending through bolt openings 118 and through bolt openings 80 formed in bracket 78. Nuts 122 are secured to the threaded ends of bolts 120.

Figure 8:
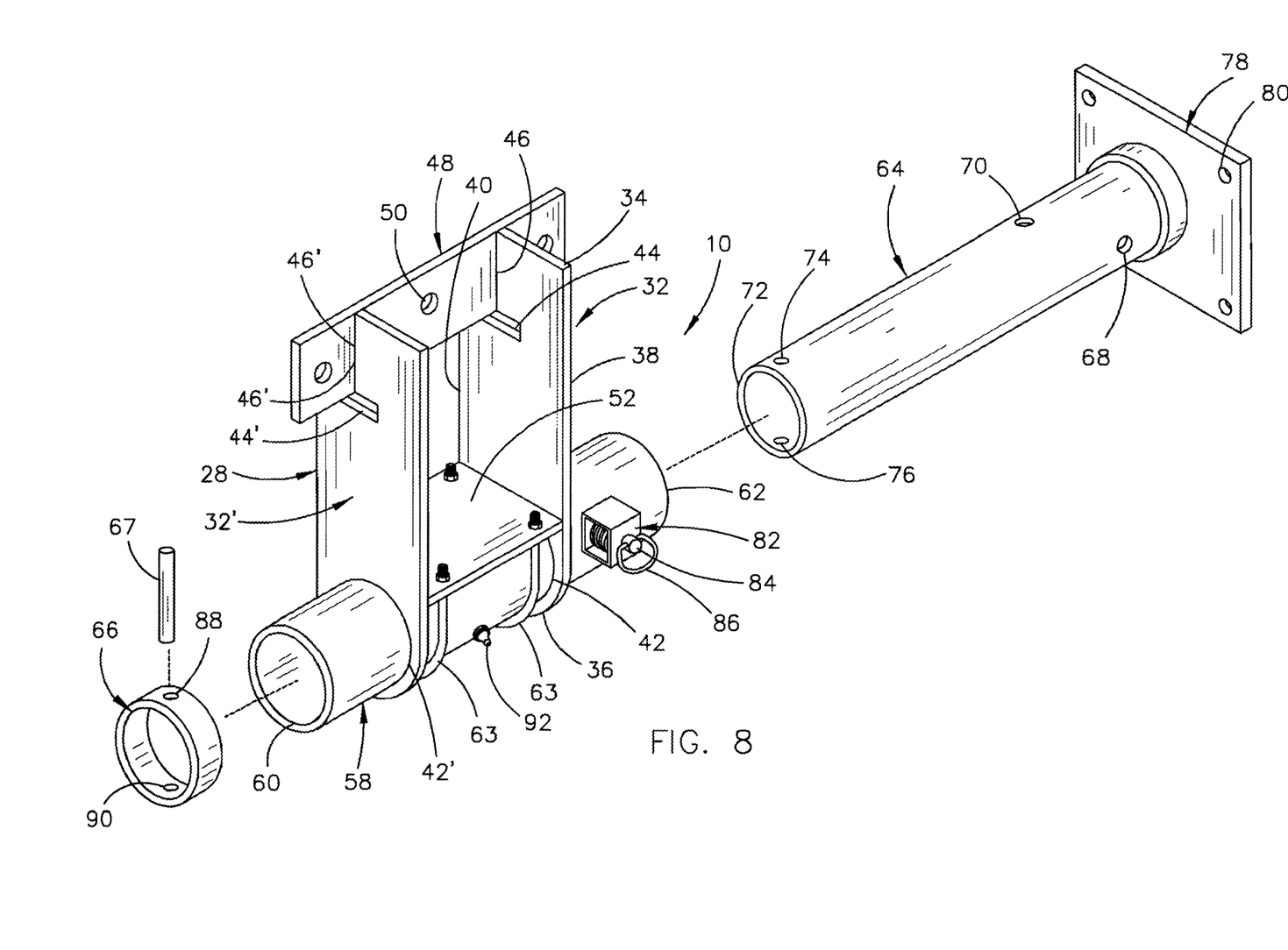
FIG. 8 is a partial exploded perspective view of the ladder assembly of this invention.
Figure 9:
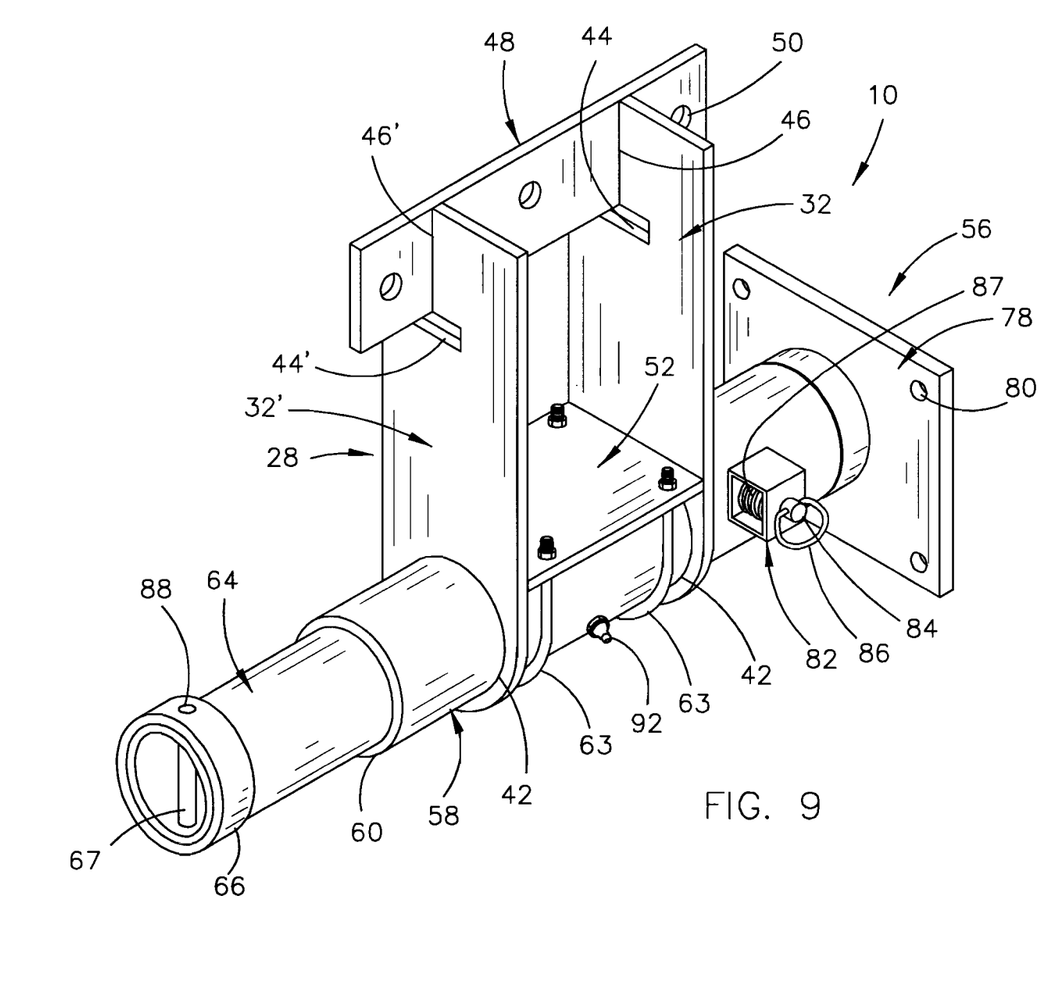
FIG. 9 is a partial perspective view of the ladder assembly of this invention in its retracted position.
Figure 10:
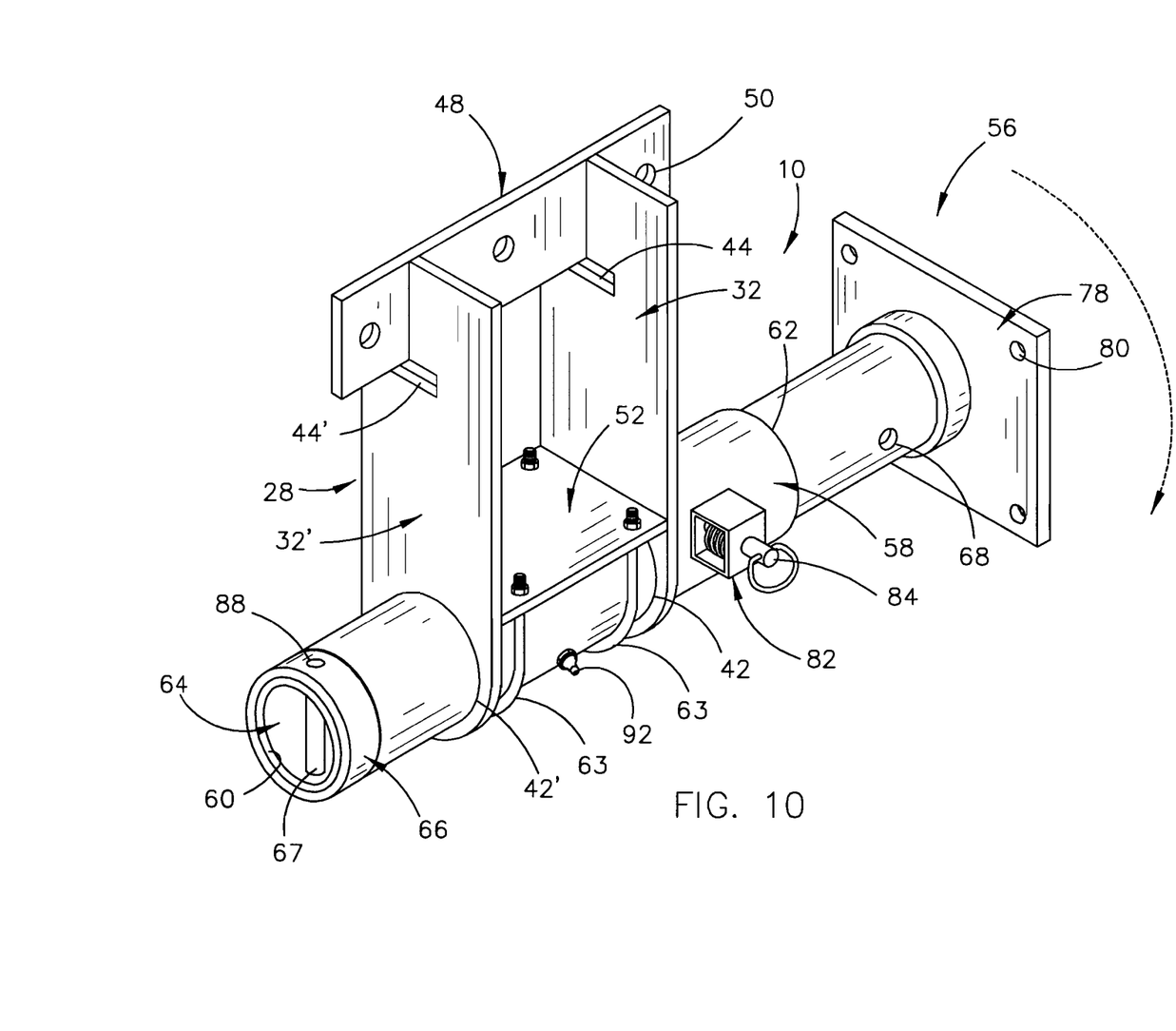
FIG. 10 is a partial perspective view of the ladder assembly of this invention in its extended position.
Figure 11:
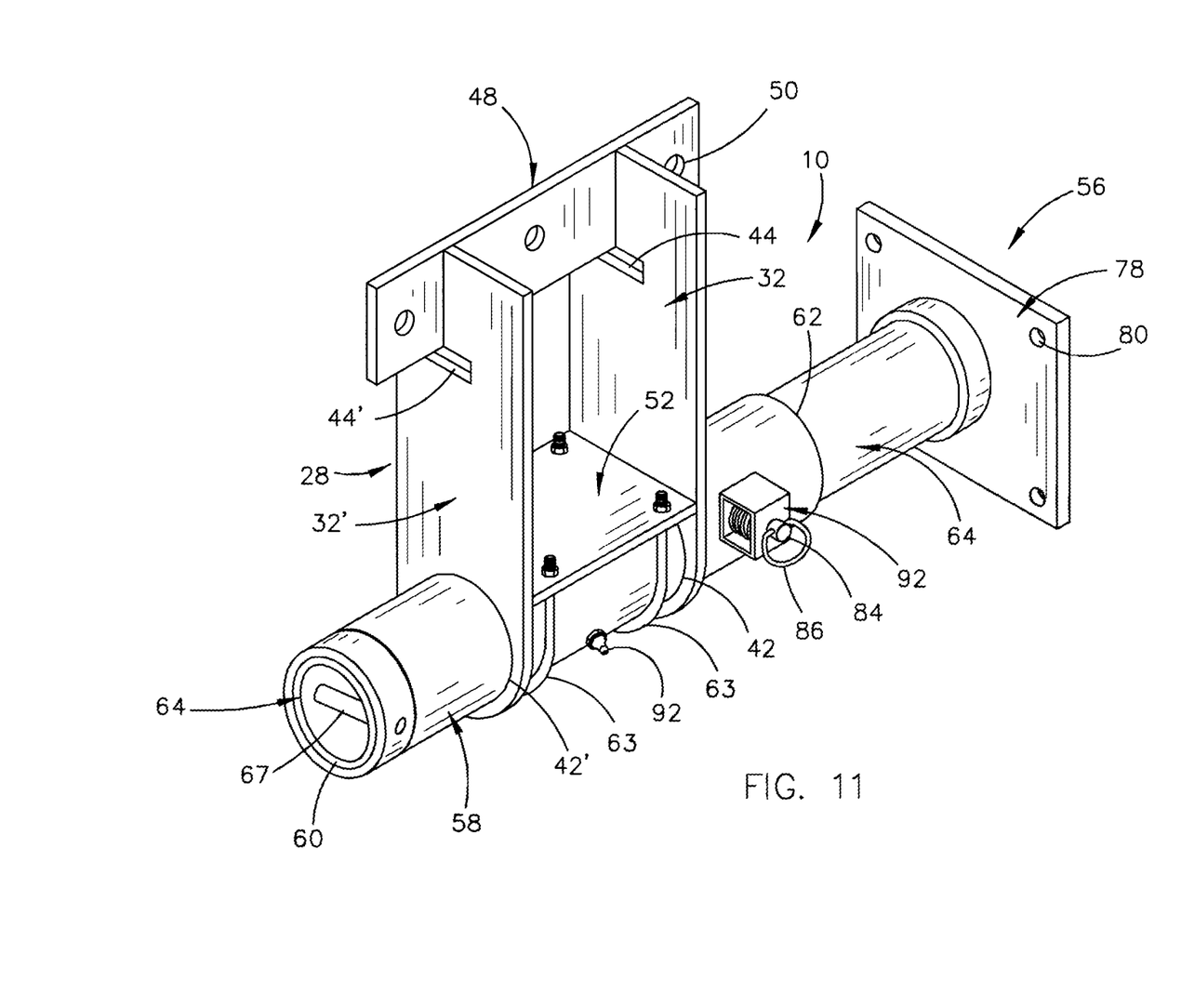
FIG. 11 is a view similar to FIG. 10 but which illustrates the ladder support having been rotated 90 degrees from the position of FIG. 10.

The assembly 10 is assembled as will now be described. Tube 58 is extended through the circular holes 42 and 42' with end 60 of tube 58 being positioned outwardly of plate 32' as seen in FIG. 8. The tube 58 is held in position by the U-bolts 63. The tube 64 is then extended through tube 58 until the inner end 72 of tube 64 is positioned inwardly of inner end 60 of tube 58. The retainer ring 66 is then slipped onto the inner end 72 of tube 64. The pin 67 is then extended through pin opening 88 in ring 66, through pin opening 76 of tube 64, through pin opening 76 in tube 64 and through pin opening 90 of ring 66. The tube 64 is then slidably moved outwardly in tube 58 until ring 66 abuts the inner end 60 of tube 58. If not already done so, the mounting plate 48 is bolted to the proper cross-member 26. When so bolted, the lower flange of the cross-member 26 will be received in the slots 44 and 44' of plates 32 and 32' respectively.

Usually, the ladder 100 will be horizontally disposed at this time. The locking pin 76 will usually be in its retracted position as the tube 64 is slipped into the tube 58. The tube 64 is slipped into the tube 58 until the pin opening 68 in tube 64 registers with the locking pin 76 at which time the inner end of locking pin 76 will move inwardly into pin opening 68 which locks or maintains the ladder 100 in its retracted and horizontally disposed stowed position.

When the ladder 100 is to be used, the locking pin 76 will be pulled outwardly to disengage pin 76 from pin opening 68. The ladder 100 and the tube 64 will then be pulled outwardly until ring 66 engages the inner end 60 of tube 58. The ladder 100 will then be rotated 90 degrees whereby the locking pin 76 will register with pin opening 70 and move inwardly thereinto to lock or maintain the ladder 100 in its upstanding and extended position at the side of the flat bed 16 of the truck.

Figures 12, 13:
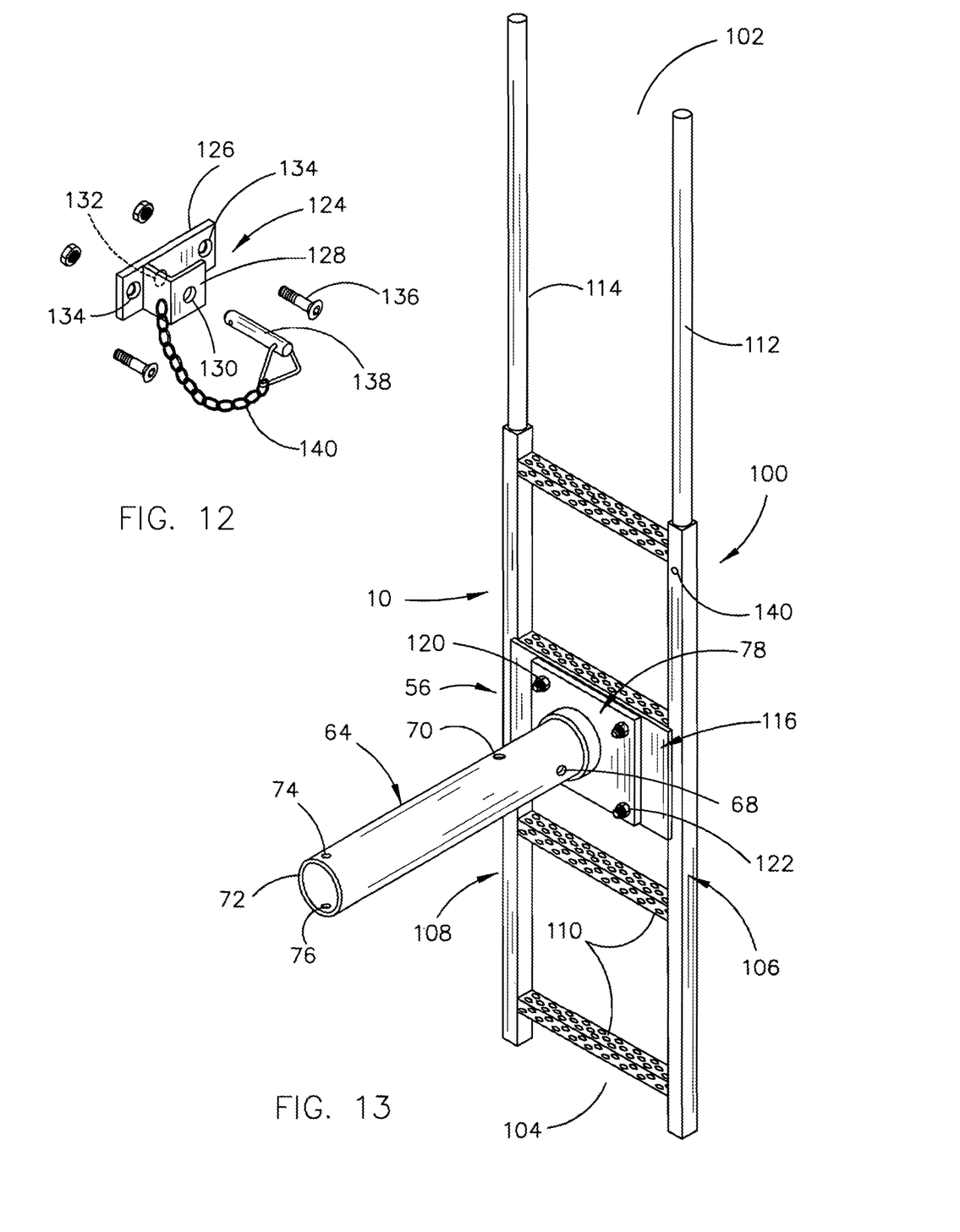
FIG. 12 is an exploded perspective view of the safety lock of this invention.
FIG. 13 is a partial perspective view of the ladder assembly with the ladder thereof being in its upstanding position.

An additional safety measure of the invention is the locking device 124 which includes a plate 126 which has an L-shaped bracket or channel 128 extending therefrom. Channel 128 has a pin opening 130 formed therein which registers with the pin opening 132 formed in plate 126. Plate 126 has a pair of bolt openings 134 formed therein to enable the device 124 to be bolted to the side of the flat bed 16 by bolts 136. Pin 138 is configured to be received in opening 130 and opening 132. When the ladder 100 is in the upright position, the side member 106 is received within the channel 128. The pin 138 is then extended through opening 130, through an opening 140 formed in side member 106 and through the opening 132 to lock the ladder 100 in its upright position.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

We claim:

1. A ladder assembly for use with a flat bed truck having an elongated and longitudinally extending wheeled frame having a plurality of spaced-apart cross-members supporting a flat bed thereon with the flat bed having an upper side, a lower side, a forward end, a rearward end, a first side and a second side, comprising:
   a mounting bracket secured to one of the cross-members inwardly of the first side of the flat bed so as to be positioned beneath the lower side of the flat bed;
   a ladder support assembly secured to said mounting bracket;
   said ladder support assembly including a selectively horizontally movable and rotatable support which is selectively moveable between extended and retracted positions and which is selectively rotatable between first and second positions with respect to said mounting bracket;
   a ladder having a lower end and an upper end;
   said ladder being secured to said support for horizontal movement therewith and for rotational movement therewith;
   said ladder, when said support is in said retracted position and in said first position, being stowed in a horizontally disposed position beneath the lower side of said flat bed at said first side of said flat bed;
   said ladder, when said support is in said extended position and in said second position, being positioned in an upright position outwardly of said first side of said flat bed;
   a first locking pin structure for selectively locking said support in said retracted and extended positions; and
   a second locking pin structure for selectively locking said support in said extended position.

2. A ladder assembly for use with a flat bed truck having an elongated and longitudinally extending wheeled frame which has a plurality of horizontally spaced-apart and horizontally disposed cross-members secured thereto which support a flat bed thereon with the flat bed having an upper side, a lower side, a forward end, a rearward end, a first side and a second side, comprising:
   a vertically disposed mounting bracket having an upper end, a lower end, an inner side and an outer side;
   said upper end of said mounting bracket being secured to one of the cross-members so as to be positioned beneath the lower side of the flat bed inwardly of the first side of the flat bed;
   a horizontally disposed and cylindrical hollow first tube having an inner end and an outer end;
   said first tube being secured to said lower end of said mounting bracket whereby said first tube is parallel to the cross-member to which said mounting bracket is secured;
   said outer end of said first tube being positioned inwardly of the first side of the flat bed and positioned below the lower side of the flat bed;
   an elongated second tube mounted in said first tube, having inner and outer ends, which is selectively horizontally movable within said first tube between retracted and extended positions with respect to said first tube;
   said second tube also being selectively rotatable between first and second positions with respect to said first tube;
   a first locking pin structure for selectively locking said second tube in said retracted and extended positions;
   a second locking pin structure for selectively locking said support in said extended position;
   an elongated ladder having an upper end and a lower end;
   said ladder being secured, intermediate said upper and lower ends thereof, to said outer end of said second tube for movement with said second tube;
   said ladder being horizontally disposed in a stowed position below the lower side of the flat bed inwardly of the first side of the flat bed when said second tube is in said retracted position and when said second tube is in said first position; and
   said ladder being positioned in an upright position outwardly of the first side of the flat bed when said second tube is in said extended position and said second tube is in said second position.

3. A ladder assembly for use with a flat bed truck having an elongated and longitudinally extending wheeled frame which has a plurality of horizontally spaced-apart and horizontally disposed cross-members secured thereto which support a flat bed thereon with the flat bed having an upper side, a lower side, a forward end, a rearward end, a first side and a second side, comprising:
   a vertically disposed mounting bracket having an upper end, a lower end, an inner side and an outer side;
   said upper end of said mounting bracket being secured to one of the cross-members so as to be positioned beneath the lower side of the flat bed inwardly of the first side of the flat bed;
   a horizontally disposed and cylindrical hollow first tube having an inner end and an outer end;
   said first tube being secured to said lower end of said mounting bracket whereby said first tube is parallel to the cross-member to which said mounting bracket is secured;
   said outer end of said first tube being positioned inwardly of the first side of the flat bed and positioned below the lower side of the flat bed;
   an elongated second tube mounted in said first tube, having inner and outer ends, which is selectively horizontally movable within said first tube between retracted and extended positions with respect to said first tube;
   said second tube also being selectively rotatable between first and second positions with respect to said first tube;
   a first locking structure for selectively locking said second tube in said retracted and extended positions and for selectively locking said second tube in said second position;

an elongated ladder having an upper end and a lower end;

said ladder being secured, intermediate said upper and lower ends thereof, to said outer end of said second tube for movement with said second tube;

said ladder being horizontally disposed in a stowed position below the lower side of the flat bed inwardly of the first side of the flat bed when said second tube is in said retracted position and when said second tube is in said first position;

said ladder being positioned in an upright position outwardly of the first side of the flat bed when said second tube is in said extended position and said second tube is in said second position;

said mounting bracket comprising:
 (a) a vertically disposed outer plate having an upper end and a lower end;
 (b) a vertically disposed inner plate having an upper end and a lower end which is spaced from said outer plate;
 (c) a horizontally disposed flat plate secured to said upper ends of said outer and inner plates and which extends therebetween;
 (d) said flat plate being configured to be secured to the associated cross-member;
 (e) said outer plate having a circular opening formed therein above said lower end of said outer plate;
 (f) said inner plate having a circular opening formed therein above said lower end of said inner plate;
 (g) a horizontally disposed support plate secured to said outer and inner plates above said circular openings in said outer and inner plates;
 (h) said first tube being positioned in said circular openings in said outer and inner plates; and
 (i) at least one U-bolt connecting said first tube to said support plate.

\* \* \* \* \*